United States Patent [19]
Johnston

[11] Patent Number: 5,897,383
[45] Date of Patent: Apr. 27, 1999

[54] CROSS-CONNECT BUS

[75] Inventor: James J. Johnston, St. Petersburg, Fla.

[73] Assignee: The Wiremold Company, West Hartford, Conn.

[21] Appl. No.: 08/848,516

[22] Filed: Apr. 28, 1997

Related U.S. Application Data

[63] Continuation-in-part of application No. 08/381,713, Jan. 31, 1995, Pat. No. 5,624,267.

[51] Int. Cl.⁶ ...................................................... H01R 9/22
[52] U.S. Cl. .............................................. 439/54; 439/507
[58] Field of Search .................................... 439/54, 74, 75, 439/404, 607, 620, 709, 715, 716, 720–724, 922, 941

[56] References Cited

U.S. PATENT DOCUMENTS

| | | | |
|---|---|---|---|
| 4,652,070 | 3/1987 | Suffi | 439/404 |
| 4,846,735 | 7/1989 | Teichler et al. | 439/922 |
| 5,281,163 | 1/1994 | Knox et al. | 439/404 |
| 5,624,267 | 4/1997 | Johnston | 439/922 |

*Primary Examiner*—Neil Abrams
*Assistant Examiner*—Brian J. Biggi
*Attorney, Agent, or Firm*—McCormick, Paulding & Huber

[57] ABSTRACT

A cross-connect bus for plugging engagement with a cross-connect panel having a plurality of rows of projecting insulation displacement connectors.

14 Claims, 4 Drawing Sheets

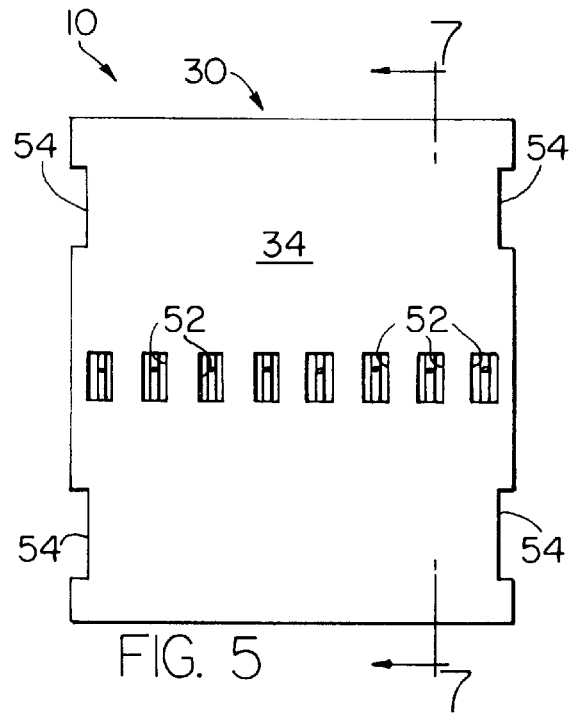
FIG. 5
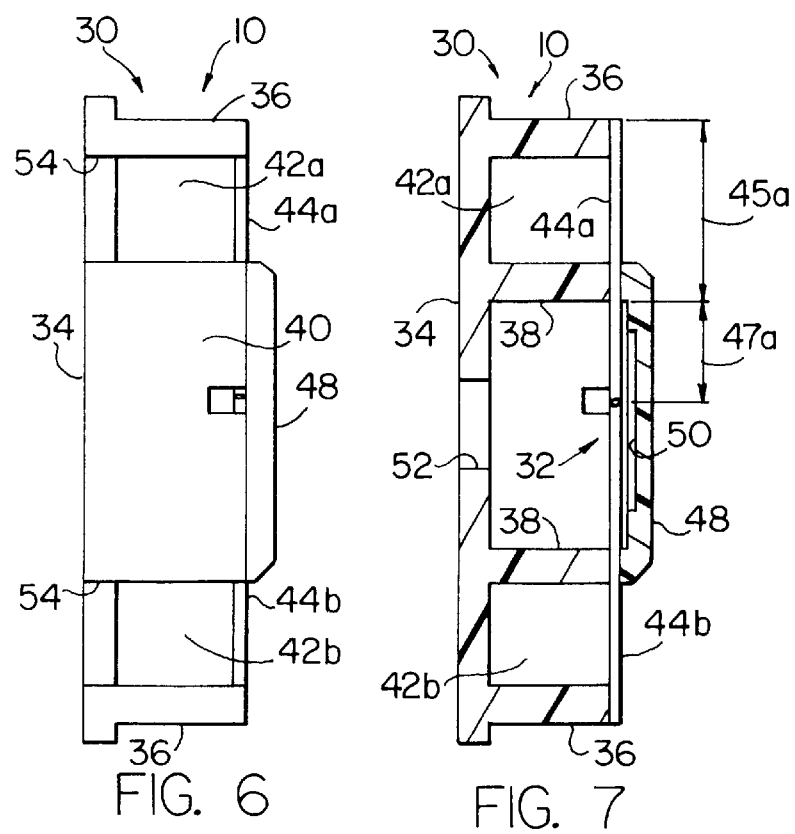
FIG. 6
FIG. 7

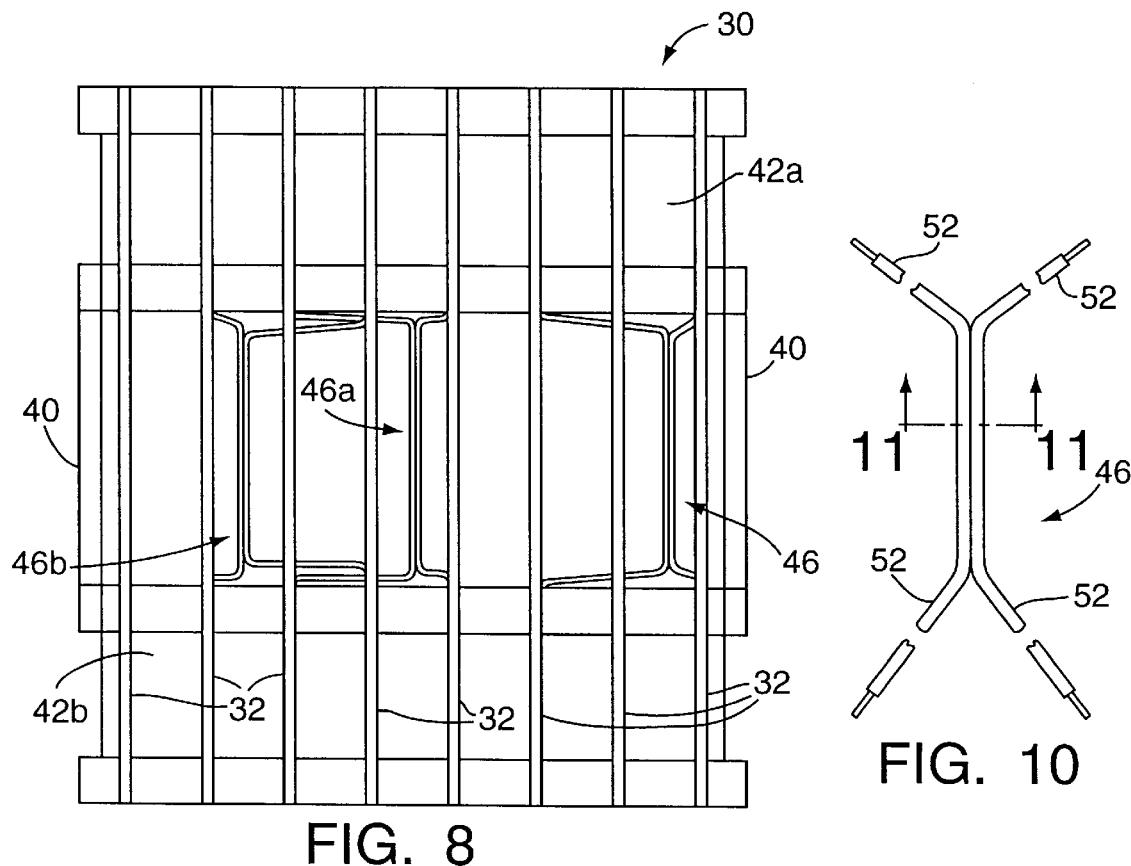
FIG. 8
FIG. 10
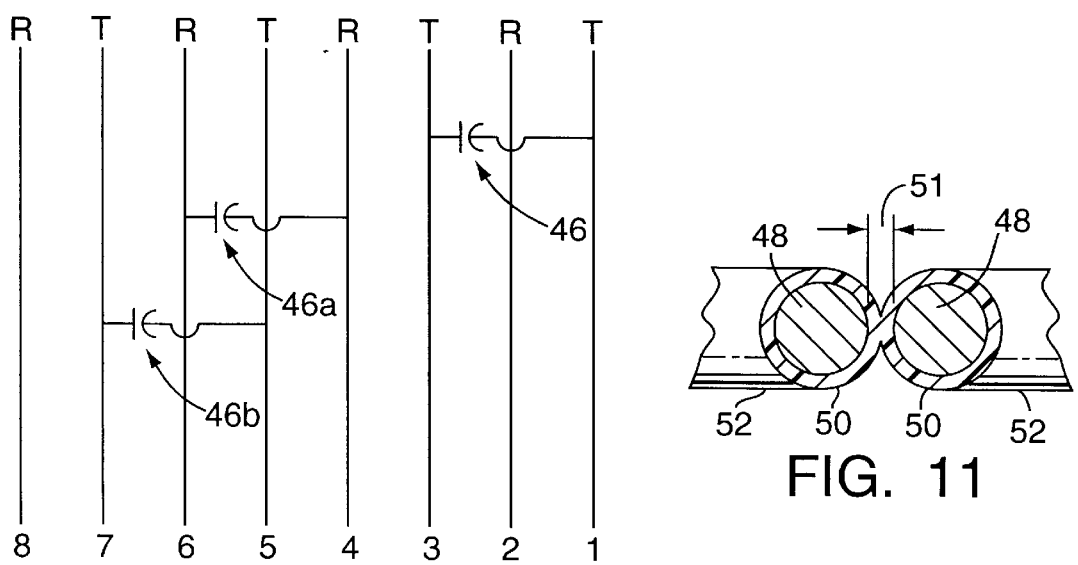
FIG. 9
FIG. 11

CROSS-CONNECT BUS

CROSS REFERENCE TO RELATED APPLICATIONS

This application is a continuation-in-part of application Ser. No. 381,713, filed Jan. 31, 1995 now U.S. Pat. No. 5,624,276.

BACKGROUND OF THE INVENTION

This invention relates in general to telecommunication equipment and deals more particularly with a cross-connect bus for use on a cross-connect panel.

The cross-connect bus of the present invention is particularly adapted for connection to a cross-connect panel, such as an AT&T 110 type panel, to establish desired circuit paths at the panel. Such a cross-connect panel provides a convenient centralized location for networking the communications and data processing systems within a building and for interconnecting the systems with an outside telecommunications network.

In most modern cross-connect panel systems, patch cords are employed at the panel to establish the various required circuits. A typical patch cord includes a flexible stranded wire cord with a patch plug attached to each end. Each patch plug generally has a housing containing an in-line array of flat contact blades adapted to be simultaneously pressed or plugged into and extracted from an equal number of mating insulation displacement contacts (IDCs) mounted on and projecting from an associated cross-connect panel. Typically, the contact blades within each patch plug housing are connected to individual stranded wire conductors in the patch cord by IDC terminations. Such stranded wire patch cords afford considerable flexibility, for ease of cable buildup during panel board installation, but are relatively expensive to produce, occupy considerable space and often present a generally confused wiring pattern at the panel.

The problems of near end crosstalk associated with the electrical connectors used on a patch cord of the aforedescribed general type is well known in the telecommunications art.

Accordingly, it is the general aim of the present invention to provide a compact low cost cross-connect bus for completing circuits at a cross-connect panel. it is a further aim of the invention to provide a cross-connect bus which compensates for near end crosstalk in signal transmission paths through the bus to satisfy Category 5 performance standards.

SUMMARY OF THE INVENTION

A cross-connect bus for connection to a cross-connect panel having a plurality of rows of forwardly projecting plugging elements. The cross-connect bus comprises a support base having a front wall and a plurality of rearwardly projecting walls defining a pair of spaced apart rearwardly and laterally open receptacles for receiving therein plugging elements in two of the rows. At least one pair of electrical contact elements for providing signal transmission paths through said bus consists of two single axially elongated contact members arranged in spaced apart parallel relation to each other and supported on said rearwardly projecting walls. Each of the contact members extends across the support base and bridges each of the receptacles.

The bus may also include compensating means disposed in a space defined by the support base and between the receptacles for controlling the occurrence of cross talk in signal transmission paths through the bus.

BRIEF DESCRIPTION OF THE DRAWINGS

FIG. 5 is a front elevational view of the cross-connect bus of FIGS. 1 and 2.

FIG. 6 is a somewhat enlarged side elevational view of the cross-connect bus.

FIG. 7 is a sectional view taken along the line 7—7 of FIG. 5.

FIG. 8 is a somewhat enlarged rear elevational view of the cross-connect bus.

FIG. 9 is a somewhat schematic view of the contact elements and compensating capacitors shown in FIG. 8.

FIG. 10 is a fragmentary planned view of a typical formed wire capacitor shown with the leads in an unformed state.

FIG. 11 is a somewhat enlarged fragmentary sectional view taken along the line 11—11—of FIG. 10.

DETAILED DESCRIPTION OF PREFERRED EMBODIMENT

Figure 1:
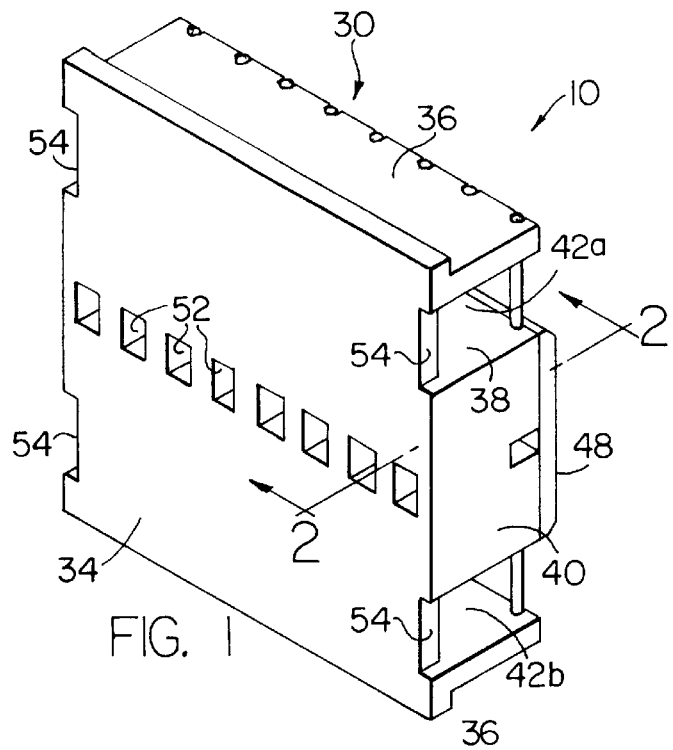
FIG. 1 is a perspective view of a cross-connect bus embodying the present invention.
Figure 2:
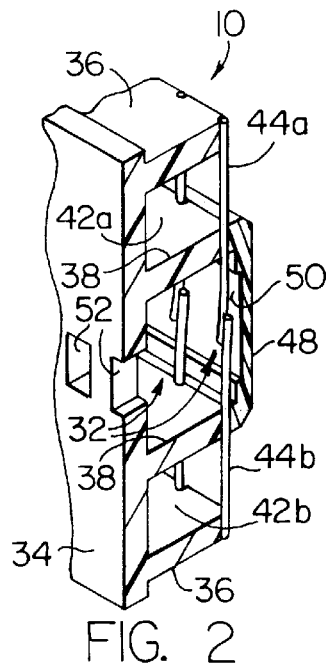
FIG. 2 is a somewhat enlarged fragmentary sectional view taken along the line 2—2 of FIG. 1.

Turning now to the drawings, a cross-connect bus embodying the present invention and made in accordance with the invention is shown in FIGS. 1 and 2 and indicated generally by the reference numeral 110. The illustrated cross-connect bus 10 is particularly adapted for connection to a cross-connect panel of a well known type usually found in large office buildings and other commercial establishments for networking the communications and data processing systems within a building and interconnecting those systems with an outside telecommunication network. The cross-connect bus 10 is used to interconnect wire conductors terminated at such a cross-connect panel which is hereinafter more fully described.

Figure 3:
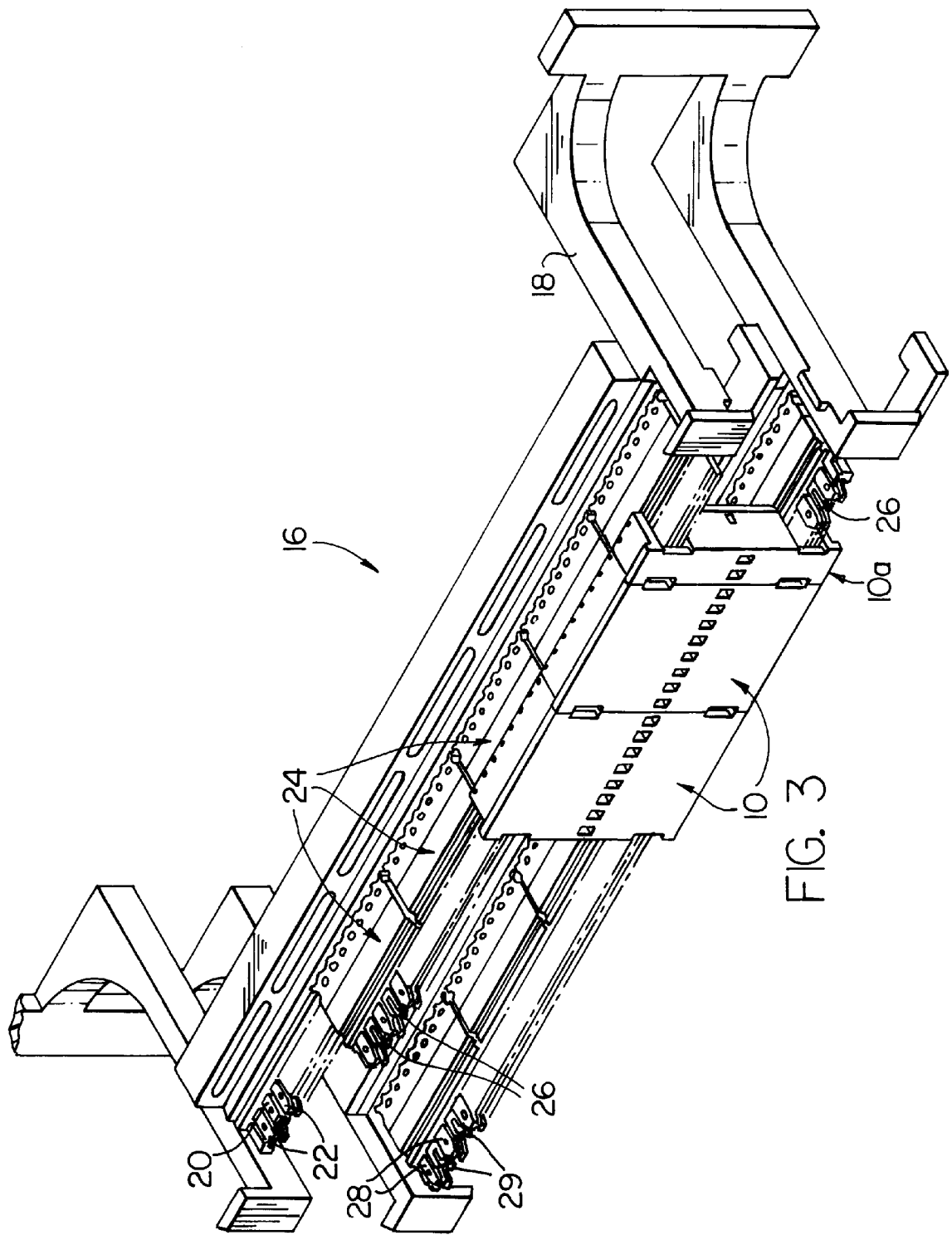
FIG. 3 is a perspective view of a typical cross-connect panel having a plurality of parallel rows of insulation displacement connectors and shown with cross-connect buses embodying the present invention connected thereto.

FIG. 3 illustrates a typical wall mounted cross-connect panel of a type with which the cross-connect bus 10 is used. The illustrated panel, indicated generally by the numeral 16, is an AT&T 110 cross-connect panel (110 AWI-100) and includes a frame 18 molded from dielectric plastic material. A plurality of parallel rows of spaced apart first plugging elements 20, 20 and 22, 22 project forwardly from the frame. The illustrated frame 18 has two such rows of first plugging elements. The end portions of individual wire conductors to be interconnected at the cross-connect panel 16 are received in the spaces between the first plugging elements 20, 20 and 22, 22 and terminated by connector blocks of a well known type, indicated generally at 24, 24 and which carry double ended IDC connectors and snap into lock-on engagement with the frame 18.

Figure 4:
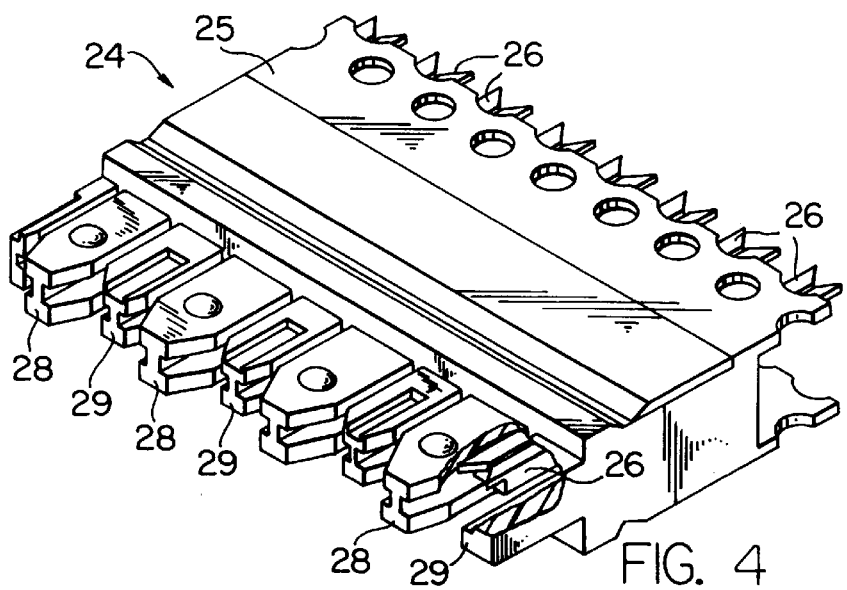
FIG. 4 is a somewhat enlarged perspective view of a typical connector block.

A typical connector block 24, shown in FIG. 4, has a dielectric body 25 and carries an in-line array of double ended connector elements 26, 26. Each connector element 26 has insulation displacement connectors (IDCs) at its opposite ends. The IDCs at the rear of the connector elements 26, 26 project from the rear or frame engaging side of the connector block 24 and simultaneously terminate an in-line array of individual wire conductors positioned in the spaces between associated plugging elements 20, 20 and 22, 22 carried by the frame 18 when the connector block 24 is snapped into locking engagement with the frame. The IDCs at the opposite or front end of the connector elements 26, 26 are alternately arranged in spaces between second plugging elements 28, 28 and 29, 29 integrally formed on the front end of the connector block body 25.

The illustrated cross-connect bus 10 is particularly adapted to interconnect IDCs exposed at the front ends of connector blocks 24, 24 in one row on the panel 16 with IDCs exposed at the front ends of connector blocks 24, 24 in another immediately adjacent parallel row, therefore, when the panel 16 is installed or wired incoming and outgoing pairs of wire conductors to be interconnected at the panel will be terminated at the panel by IDCs 20, 20 and 22, 22 associated with connector blocks 24, 24 and in immediately adjacent rows on the panel.

The illustrated cross-connect bus 10 essentially comprises a unitary support base indicated generally by the reference numeral 30 and a plurality of pairs of contact elements mounted on the support base and indicated generally by the numerals 32, 32.

Considering now the cross-connect bus 10 in further detail and as oriented in FIGS. 1 and 2 and 5–8, the support member 30 is preferably molded from durable dielectric plastic material and has a generally rectangular front wall 34. A pair of generally rectangular upper and lower outer end walls 36, 36 project rearwardly from the upper and lower ends of the front wall 34 in parallel relation to each other. A pair of generally rectangular upper and lower inner end walls 38, 38 spaced inwardly from the outer end walls 36, 36 and from each other project rearwardly from the front wall in parallel relation to the outer end walls 36, 36. Preferably, and as shown, sidewalls 40, 40 project rearwardly from the front wall and extend between and connect the opposite ends of the inner end walls 38, 38. Each outer end wall 36 cooperates with an associated inner end wall 38 and a portion of the front wall 34 to define a longitudinally extending rearwardly and laterally open receptacle. The resulting two elongated receptacles, located at the upper and lower ends of the bus 10 and indicated at 42a and 42b, respectively, are spaced apart an appropriate distance and indicated at 42a and 42b, respectively, are spaced apart an appropriate distance and are sized to receive the plugging elements and associated IDCs 26, 26 on associated connector blocks 24, 24 mounted in adjacent rows on a cross-connect panel, such as the upper and lower rows on the panel 16 shown in FIG. 3.

The contact element used in practicing the invention may take various forms. However, in accordance with presently preferred practice, each contact element 32 is formed from a single length of resilient, relatively hard, generally cylindrical wire, as, for example, phosphor bronze wire. Solid 25 Gauge wire (0.018 inch dia.) has proven well suited for use with the IDCs on a cross-connect panel of the type shown in FIGS. 3 and hereinbefore described.

Further referring to the drawings and particularly to FIGS. 7 and 8, each contact element on contact member 32 consists of a continuous unitary solid wire conductor and has an upper end section designated by the numeral 44a and a lower end section indicated at 44b. Each upper end section 44a is supported by the upper outer end wall 36 and the upper inner end wall 38 and bridges the upper receptacle 42a. Each contact element lower end section 44b is supported by the alower outer end wall 36 and the lower inner end wall 38 and bridges or spans the lower receptacle 42b. Thus, the contact elements 32, 32 which comprise the cross-connect bus 10 are mounted on the support member or base 30 in parallel uniformly spaced apart relation to each other for plugging engagement with the forward ends of IDCs, 26, 26 exposed at the front ends of the connector blocks. More specifically, the upper end sections 44a, 44a associated with the upper receptacle 42a are adapted to pluggingly engage IDCs on connector blocks 24, 24 which comprise the upper row-of connector blocks on the illustrated cross-connect panel 16, shown in FIG. 3. In like manner, the lower end sections 44b, 44b associated with lower receptacle 42b are arranged for plugging connection with IDCs on connector blocks 24, 24 which comprise the lower row of connector blocks on the panel 16. Thus, the parallel contact elements 32, 32 provide electrical connection between pairs of insulated wire conductors (not shown) terminated at adjacent rows on the panel 16.

The problem of controlling near end crosstalk associated with telecommunication connectors having closely spaced generally parallel contacts or connecting members is well known in the art. However, with respect to the present cross-connect bus 10, the parallel arrangement of the various contact elements 32, 32, the effective length of the contact elements and the spacing between the elements is substantially dictated by the geometry of the cross-connect panel 16 with which the bus is designed to intermate. It will be evident that the spacing between the parallel contact members 32, 32 is necessarily substantially greater than the relatively close spacing maintained between the parallel contacts in an industry standard FCC modular jack. This relatively large spacing between adjacent parallel contacting or connecting elements effectively reduces the problem of near end crosstalk within the various signal paths defined by the parallel elements 32, 32. En accordance with the present invention, the problem of near end crosstalk is further controlled by providing capacitance to compensate for the presence of electrical imbalance between contact element pairs. More specifically, to compensate for such electrical imbalance, one or more discrete capacitors, indicated generally at 46, 46, are disposed within the space between the upper and lower receptacles 42a and 42b, and connected between pairs of contact elements 32, 32, as will hereinafter more fully discussed.

In accordance with presently preferred construction, each capacitor 46, consists of and is formed from a length of electrically insulated wire pair consisting of individually insulated axially elongated solid wire conductors 48, 48 bonded together in parallel relation to each other by the wire insulating material. Typically, each wire conductor 48 consists of a single solid wire formed from an electrically conductive material such as copper and coated with a thin film of insulating material, as, for example, enamel or a suitable plastic material such as vinyl or polyethylene. A typical capacitor 46 of the type employed in the bus 10 is shown in FIGS. 10 and 11 and includes a pair of 35 gauge solid wire conductors 48, 48 coated with a film of insulation 50 which also bonds the wires in assembly in parallel side-by-side relation to each other and which provides a spacing of approximately 0.0006 inches between the wire conductors, as indicated by the numeral 51 in FIG. 11. The end portions of the wire conductors 48, 48 are separated from each other, generally as shown in FIG. 10 to form integral leads 52, 52 to facilitate connection to an associated pair of spaced apart electrical contacts 32, 32, substantially as shown in FIGS. 2 and 8. Insulation is stripped from the terminal end portions of the leads 52, 52 which leads are electrically connected to an associated pair of contact elements 32, 32. The manner in which these electrical connections are formed may vary. However, in accordance with presently preferred construction, the stripped or bare terminal end portions of the leads 52, 52 are secured in direct electrical contact with associated portions of the bare wire contact elements 32, 32 during assembly of the contact elements with the support base 30. Thus, with particular reference to FIG. 2, it will be noted that the bare end portions of the illustrated leads 52, 52 are secured in direct electrical engagement with the conductor 32 by assembly with the inner walls 38,38 of the support base. Preferably an ultrasonic welding process is employed to affect the aforesaid assembly.

The number of contact members 32, 32 mounted on the support base 30 may vary. However, the illustrated cross-connect bus 10 is adapted to connect four pair of incoming telecommunication conductors terminated at the cross-connect panel 16 to four pair of outgoing telecommunication conductors terminated at the cross-connect panel 16 and, as shown in FIG. 8, carries eight contact elements 32,32.

Referring now particularly to FIGS. 8 and 9 the manner in which the capacitors are connected to the contact elements 32, 32 is further illustrated. In FIG. 9, where portions of tip and ring circuits (not shown) connected by contact elements or members 32, 32 are indicated, respectively, by the letters T and R, the schematically illustrated contact elements 32, 32 are arranged in an in-line series and in parallel spaced apart relation to each other in substantially the same manner in which the contact elements are supported within the bus 10. A first capacitor 46 is connected between the first and third contact elements in the series, substantially as shown. A second capacitor, indicated at 46a is connected between the fourth and sixth contact elements in 32, 32 in the series. In like manner, the fifth and seventh contact elements in the series are connected by a compensating capacitor indicated at 46b. The arrangement of the signal pair which comprise the second and eighth contract elements in the series is such that compensation is not required.

Preferably, and as best shown in FIGS. 1, 2, 6 and 7 a cap 54 is mounted on the rear of the support base 30 and comprises a part of the support base. The cap is ultrasonically welded or otherwise suitably attached to the rearwardly facing surfaces of the inner end walls 38, 38 and the sidewalls 40, 40 and forms a protective cover for the central portions of the contact sets 32, 32. The cap 54 closely overlies portions of the contact elements 32, 32 supported by the inner end walls 38, 38 and stabilizes the contact elements at these mounting points. The cap 54 also provides a closure for the space between the receptacles and cooperates with the front wall 34, the inner end walls 38, 38 and the side walls 40, 40 to substantially encapsulate the formed wire capacitors 46, 46a and 46b suspended within the latter space, thereby protecting the bus 110 from damage by careless handling.

Outwardly open notches 56, 56 at opposite sides of the front wall 34 aid in removing the bus 10 from connected engagement with the panel 16 when an array of buses 10, 10 are mounted on an associated cross-connect panel 16 in immediately adjacent side-by-side relation to each other. The notches are sized to receive the tip of a tool, such as a screwdriver, which may be used to pry a bus 10 out of plugging engagement with the panel 16 without first removing at least one of the adjacent buses from the panel.

The use of discrete capacitors to compensate for reactive imbalance between wire pairs in telecommunication signal transmission circuits is well known in the art. However, the use of this approach to improve crosstalk performance in a telecommunication connector normally adds to the cost of the connector the cost of the discrete capacitors and the additional labor required to solder or otherwise join the capacitors to the connector assembly. In accordance with the present invention simple capacitors formed from lengths of paired wire are employed and assembled as a part of the normal contact assembly operation thereby providing for substantial improvement in crosstalk performance without adding significantly to the cost of the finished product.

Due to the required geometry of the product, as hereinbefore discussed, and the resulting relatively wide spacing between the contact elements 32, 32, the product may be manufactured without the discrete capacitors for use in an environment where Category 3 performance is acceptable. Another cross-connect bus which has two contact elements and connects a single pair of conductors terminated at the panel 16 is shown mounted on the cross-connect panel 16 and indicated generally by the reference numeral 10a in FIG. 3. The illustrated embodiment 10a is in all respects identical to the bus 10 hereinbefore described except that it has only two contact elements (not shown). The illustrated bus 10a is particularly adapted for use in an environment where Category 3 performance is acceptable and does not include a compensating capacitor.

When the present bus is produced with proper wire formed capacitors properly arranged, as hereinbefore discussed, the resulting product will meet or exceed Category 5 performance requirements. Further, and in accordance with the invention, a bus may also be produced with a single pair of contact or a plurality of contact pair for use in an environment where Category 3 performance is acceptable, and such modified forms of the invention are contemplated.

I claim:

1. A cross-connect bus for connection to a cross-connect panel having a plurality of rows of forwardly projecting plugging elements, said cross connect bus comprising a support base having a front wall and a plurality of rearwardly projecting wails defining a pair of spaced apart rearwardly open receptacles for receiving therein pluggling elements in two of the rows, a plurality of pairs of electrical contact elements for providing signal transmission paths through said bus and including axially elongated contact members arranged in spaced apart parallel relation to each other and supported on said rearwardly projecting walls, each of said contact members extending across said support base and bridging each of said receptacles, and compensating means supported in a space between said receptacles for controlling the occurrence of crosstalk in signal transmission paths through said bus.

2. A cross-connect bus as set forth in claim 1 wherein said compensating means comprises at least one discrete capacitor connected between the contact members of one of said pairs.

3. A cross-connect bus as set forth in claim 2 wherein said at least one discrete capacitor consists of a single length of paired wire including two individually insulated wire conductors joined together by insulation along a portion of said length.

4. A cross-connect bus as set forth in claim 3 wherein said at least one discrete capacitor includes integral leads formed by opposite end sections of said two conductors and joined to said at least one pair of electrical contact elements.

5. A cross-connect bus as set forth in claim 4 wherein each of said leads includes a bare terminal end portion maintained in electrical contacting engagement with an associated one of said contacting members by an associated portion of one of said-rearwardly projecting walls.

6. A cross-connect bus as set forth in claim 1 wherein the individual said contact members of said pairs are arranged in an in-line series in parallel spaced-apart side-by-side relation to each other and said compensating means includes a first discrete capacitor connected between a first contact member and a third contact member in said series.

7. A cross-connect bus as set forth in claim 6 including a second discrete capacitor connected between a fourth contact member and a sixth contact member in said series.

8. A cross-connect bus as set forth in claim 7 including a third discrete capacitor connected between a fifth contact member in said series and seventh contact member in said series.

9. A cross-connect bus as set forth in claim 8 wherein said bus has four pairs of said electrical contact elements including eight said contact members.

10. A cross-connect bus as set forth in claim 1 wherein each of said contact members consist of a single rectilinear length of bare solid wire.

11. A cross-connect bus as set forth in claim 1 wherein each of said contact members consists of a continuous unitary solid wire conductor.

12. A cross-connect bus for connection to a cross-connect panel having a plurality of rows of forwardly projecting plugging elements, said cross-connect panel comprising a support base having a generally rectangular front wall and a plurality of generally rectangular end walls projecting rearwardly from said front wall in generally parallel spaced apart relation to each other and including a pair of outer end walls and a pair of inner end walls spaced inwardly from said outer end walls and spaced from each other, said front wall cooperating with said inner and outer ends wall to define a pair of receptacles opening rearwardly and laterally outwardly, and a plurality of pairs of electrical contact elements for providing signal paths through said bus, each of said pairs consisting of two single axially elongated contact members said contact members in said pairs being arranged in in-line series and in spaced apart parallel side-by-side relation to each other and supported on and in normal relation to said inner and outer end walls, each of said end walls extending across said support base and said receptacles, and a plurality of discrete capacitors disposed in a space between said receptacles and including a first discrete capacitor connected between a first contact member and a third contact member in said series, a second discrete capacitor connected between a fourth and a sixth contact member in said series, and a third discrete capacitor connected between a fifth and a seventh contact members in said series.

13. A cross-connect bus as set forth in claim 12 wherein said bus includes four pair of contact elements.

14. A cross-connect bus as set forth in claim 12 wherein each of said contact members consists of a continuous rectilinear length of resilient bare solid wire.

* * * * *